United States Patent [19]  [11]  4,033,888
Kiovsky  [45]  July 5, 1977

[54] DISPERSANT VI IMPROVER

[75] Inventor: Thomas E. Kiovsky, Houston, Tex.

[73] Assignee: Shell Oil Company, Houston, Tex.

[22] Filed: Oct. 18, 1976

[21] Appl. No.: 733,574

[52] U.S. Cl. .......................... 252/56 D; 260/878 R
[51] Int. Cl.$^2$ .......................................... C10M 1/24
[58] Field of Search .............. 252/56 D; 260/878 R

[56] References Cited

UNITED STATES PATENTS 3,448,174  6/1969  Loveless et al. ................ 260/878 R
3,954,812  5/1976  Puskas et al. .................... 252/56 D Primary Examiner—Delbert E. Gantz
Assistant Examiner—J. Thierstein
Attorney, Agent, or Firm—Dean F. Vance

[57] ABSTRACT

Lubricating oil additives having both dispersant and viscosity-index improving properties are prepared by reacting a block copolymer with maleic anhydride and an alkane polyol. The block copolymer has the general configuration A-B wherein A is a monoalkenyl arene block and B is a selectively hydrogenated conjugated diene block having between 75 and 98 percent hydrogenated double bonds.

8 Claims, No Drawings

DISPERSANT VI IMPROVER

BACKGROUND OF THE INVENTION

The newer engines place increased demands on the lubricants to be employed. In the past a number of different additives have been added to lubricating oils to improve such properties as viscosity index and dispersancy. One such additive added to lubricating oils to improve viscosity index is a two-block copolymer having the general configuration A-B where A is styrene and B is hydrogenated isoprene. See generally U.S. Pat. No. 3,763,044 and U.S. Pat. No. 3,772,196. Significant reductions in cost can be made by employing a single additive that improves a number of lubricant properties. However, in attempting to improve more than a single lubricant property, care must be taken in not causing the deterioration of other properties. For example, by employing an oxidation step to attach polar groups to the polymer backbone in U.S. Pat. No. 3,864,268, the patentees have reduced lubricant stability by introducing sites for oxidative attack.

SUMMARY OF THE DISCLOSURE

Ashless, oil-soluble additives having both dispersant and viscosity-index (VI) improving properties are prepared by the process comprising:

a. reacting a block copolymer having the general configuration A-B with maleic anhydride at a temperatue of between about 180°C and 250°C and in the presence of a solvent wherein each polymer block A is a monoalkenylarene polymer having an average molecular weight of between about 25,000 and about 50,000 and each block B is a polymer of a $C_{4-5}$ conjugated diene having an averae molecular weight of between about 35,000 and about 100,000 wherein between about 80% and about 98% of the aliphatic unsaturation has been reduced by hydrogenation while less than bout 20% of the aromatic unsaturation has been reduced; and b. reacting the product of step (a) with an alkane polyol having at least two hydroxy groups.

It is essential that the molecular weight of the block copolymer employed be within the range of values stated above in order for the final product to have viscosity index improving properties. Molecular weights that are two low result in greatly reduced VI improving properties, while molecular weights that are too high result in reduced stability caused by excessive shearing in the engine. In addition, it is important that the selective hydrogenation of the polymer be attained within the narrow range called for. The reason for this criticality is two-fold. First, it is important to saturate as many of the aliphatic double bonds as possible in order to improve the stability of the polymer during lubricating conditions. Second, it is essential that not all aliphatic double bonds are reduced since, as part of the invention, maleic anhydride is reacted with these residual aliphatic double bonds. Ideally, selective hydrogenation is so controlled that the optimum amount of maleic anhydride is reacted with the polymer leaving no additional double bonds along the block copolymer available for oxidative attack.

DETAILED DESCRIPTION OF THE INVENTION

The block copolymers employed in the instant invention are selectively hydrogenated two-block copolymers having the general configuration A-B where each A is a monoalkenylarene polymer and each B prior to hydrogenation, is a polymer of a $C_{4-5}$ conjugated diene. The monoalkenylarenes which may be used in the preparation of the subject class of block copolymers comprise styrene and methyl styrenes such as alphamethylstyrene, vinyl toluene and other ring methylated styrene. Styrene is the preferred monomer. Mixtures of these alkenyl arenes may be used if desired. The B block, prior to hydrogenation, is typically an isoprene polymer block or a butadiene polymer block. When the monomer employed is butadiene, it is preferred that between about 35 and 55 mol percent of the condensed butadiene units in the butadiene polymer block have a 1,2 structure. Thus, when such a block is hydrogenated, the resulting product is, or resembles, a regular copolymer block of ethylene and butene-1 (EB). When the monomer employed is isoprene, it is preferred that at least about 80 mol percent of the isoprene units have a 1,4 structure, which may be either cis or trans. The resulting product is or resembles a regular copolymer block of alternating ethylene and propylene (EP).

The block copolymers may be prepared by conventional methods using lithium-based initiators, preferably lithium alkyls such as lithium butyls or lithium amyls. Polymerization is usually conducted in solution in an inert solvent such as cyclohexane or alkanes such as butanes or pentanes and mixtures of the same. The first monomer to be polymerized (which may be either a monoalkenylarene, butadiene or isoprene) is injected into the system and contacted with the polymerization initiator which is added in an amount calculated to provide the predetermined average molecular weight. Subsequent to obtaining the desired molecular weight and depletion of the monomer, the second monomer is then injected into the living polymer system and block polymerization occurs, resulting in the formulation of the living block copolymer which is then killed, e.g., by the addition of methanol or water.

The average molecular weight of each monoalkenylarene polymer block in the precursor block copolymer may be from about 25,000 to about 50,000, preferably from about 30,000 to about 45,000. The diene polymer blocks may have average molecular weights between about 35,000 and 100,000, preferably between about 50,000 and about 80,000. The minimum total molecular weight of the block copolymer should be about 60,000, while the maximum molecular weight should be about 150,000. The weight ratio of A:B typically varies from about 0.5:1 to about 0.7:1.

The precursor block copolymer is selectively hydrogenated under the conditions chosen so that between about 75% and about 98% of the olefin double bonds in the conjugated diene polymer block will be saturated and no more than about 20% of the double bonds of the monoalkenylarene polymer blocks will be hydrogenated. Preferably between about 90 and about 95% of the olefin double bonds in the conjugated diene polymer block will be hydrogenated. It is important to prepare the block copolymer having the above degree of hydrogenation so that it is possible to derivatize the polymer through the remaining olefinic linkages. Hydrogenation is preferably done by dissolving the precursor block copolymer in an inert solvent, usually the polymerization solvent, adding a cobalt, nickel or iron carboxylate or alkoxide that has been reduced with an aluminum alkyl compound, and pressuring with hydrogen to between 50 psig and 500 psig at mild temperatures of 20° C to 70° C. The selective hydrogenation proceeds to the extent desired in about 0.1 to 1 hour. See generally Wald et al, U.S. Pat. No. 3,595,942.

The product from selective hydrogenation may be examined for remaining olefinic unsaturation by infrared spectrometry, by iodine number determination, or by ozone titration in the range of 0.1 to 1.0 meq/gram. It is preferred that infrared absorbances be low at wave lengths of 10.05, 10.35, 10.98 and 13.60 microns and that the iodine number be between 0 and about 100, indicating that at least about 75% of the olefinic double bonds are saturated. The iodine number here refers to the usual method for the analysis of fats, and is reported in units of grams iodine per hundred grams of polymer. The aromatic double bonds do not add iodine in this analytical method, so that only olefinic double bonds are counted. The iodine number of the hydrogenated polymer depends partly on the iodine number of the precursor polymer, that is the ratio of molecular weights of diene polymer block to monoalpha alkenyl arene polymer block, but in the hydrogenated block copolymers of most utility the iodine numbers fall in the range indicated. Similar considerations apply to determination by titration with ozone.

It is not desired, and indeed it is more expensive, to hydrogenate the monoalkenylarene polymer blocks, as well as the diene polymer blocks. Hydrogenation of the diene polymer block alone produces the saturated aliphatic polymer structure necessary for improved stability. Also, hydrogenation of the monoalkenylarene polymer blocks requires higher temperatures and pressures than are used to make the selectively hydrogenated block copolymers. Furthermore, the cyclohexane-type rings formed by hydrogenation of the monoalkenylarene polymer units are more susceptible to attack by oxygen than their unhydrogenated aromatic precursors. For these reasons the selectively hydrogenated block copolymers are more suitable for lubricant additives and less expensive than the fully hydrogenated polymers.

The hydrogenation may not be completely selective and some of the aromatic rings may be hydrogenated under the conditions noted above. Such an event may occur with particular catalysts, or with unusually active samples of a catalyst that is normally very selective. Hydrogenation of up to 20% of the aromatic double bonds in the subject block copolymers may occur. For this reason, hydrogenated block copolymers wherein the diene polymer blocks are more than 75% saturated and the styrene polymer blocks are 0–20% saturated are contemplated and are considered to be within the scope of this invention.

The selectively hydrogenated A-B block copolymer is then reacted with maleic anhydride in the presence of a solvent. The maleic anhydride reacts with the residual olefinic bonds available on the diene portion of the block copolymer. Usually, about 10 to 100% preferably 50 to 95% of the residual double bonds in the block copolymer are converted to succinic anhydride groups. Since it is uneconomical for practical purposes to attempt to convert all of the double bonds in the block copolymer molecule to anhydride groups, the structure of the resulting maleated polymer will typically contain some unreacted double bonds.

Various solvents may be employed in the maleation step including generally olefin-free petroleum hydrocarbons, aromatics and halogenated hydrocarbons. A preferred solvent is a lubricating oil basestock. A much preferred solvent is trichlorobenzene. Preferably, a concentration in the range of about 1 to 10 percent by weight of block copolymer in solvent may conveniently be used for maleation.

An excess of maleic anhydride over that stoichiometrically necessary to react with all the residual double bonds remaining in the diene portion of the selectively hydrogenated block copolymer is typically employed. Preferably, at least one mole of maleic anhydride is used for each olefinic unsaturation present in the selectively hydrogenated block copolymer, with equivalent ratios of maleic anhydride to olefinic double bonds of between about 1:1 and about 2:1 being particularly suitable. However, less than stoichiometric amounts of maleic anhydride may also be used.

The maleation may occur with or without the use of catalyst or radical initiators such as tertiary hydroperoxide. During thermal reaction, the temperature is typically maintained between about 180° and 250° C for between about 1 hour and about 10 hours. Typical conditions are about 225° C for about 4 hours. Any excess maleic anhydride is typically removed by either vacuum distillation or through the use of a stripping gas stream.

In a preferred emobodiment, the maleation takes place in the presence of chlorine. Chlorination has been disclosed with polymers of isobutene in U.K. Pat. No. 949,981. The molar amount of chlorine used is preferably such that the mixture of copolymer and maleic anhydride is contacted with from 0.3 to 1.5, more preferably from 0.5 to 1.2 moles of chlorine for each mole of maleic anhydride. Insofar as the conversion of the copolymer is concerned there appears to be no lower limit on the amount of chlorine which may be used. In practice, however, it is preferred to remain within the aforesaid ranges.

Suitably the mixture of copolymer and maleic anhydride is heated to the reaction temperature before it is contacted with the chlorine. The mixture is contacted with a molar deficiency of chlorine before any substantial amount, e.g. less than half, of the maleic anhydride has reacted. Suitably, substantially none of the maleic anhydride has reacted. The rate of introduction of chlorine into the mixture may vary between wide limits but is preferably such that it equals the rate of chlorine uptake. Usually the chlorine is introduced over a period of from 0.5 to 10 hours, preferably of from 3 to 7 hours.

After the chlorination treatment it is advantageous to subject the resultant product mixture to a post-reaction or thermal treatment. This thermal treatment is suitably carried out at a temperature in the range of from 140° to 220° C, preferably from 160° to 210° C. The conditions are usually such, e.g. reflux conditions, that substantially no part of the product mixture is removed during this thermal treatment. The thermal treatment may be for 0.1 to 20 hours but is preferably from 0.5 to 10 hours. Longer periods tend to increase the formation of tarry by-products.

The maleated polymer is then reacted with an alkane polyol to form the ml-soluble product of the instant invention. The resulting esters of succinic acid provide the dispersant function of the additive.

The alkane polyols useful in making the esters are alkanepolyols having at least two and preferably at least four hydroxy groups such as the trihydroxyalkanes, e.g. trihydroxybutanes, pentanes, hexanes, heptanes, octanes, nonanes, dodecanes, etc., as well as tetrahydroxy alkanes, pentahydroxy alkanes, hexahydroxy alkanes, as well as the sugar alcohols such as erythritol, pentaerythritol tetritols, pentitols, hexitols, mannitol, sorbitol, glucose, and the like. Particularly preferred alcohols are pentaerythritol and mannitol. Especially preferred is pentaerythritol.

The molar ratio of polyol to maleic anhydride is typically between about 0.1:1 and about 2:1, preferably between about 0.5:1 and about 2:1, most preferably about 1:1. The conditions during esterification are typically about 150° to 250° C for between about 1 hour and about 20 hours.

In both the esterification and maleation steps it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

If excess polyol is employed, then it may be desirable to remove the excess. One means of doing this is to first add a volume of heptane equal to the volume of dissolved additive. Then an equal volume of methanol is added. Two separate layers are therein formed; a bottom layer comprising predominantly methanol and the unreacted polyol and a top layer comprising predominantly heptane, the solvent and the additive product. After separating the bottom layer, the volatiles present in the top layer can then be removed by a distillation technique. Alternatively the excess polyol may be removed under a vacuum or with a stripping gas stream.

The reaction product of this invention can be incorporated in lubricating oil compositions, e.g., automotive crankcase oils, in concentrations within the range of about 0.1 to about 10, preferably about 0.1 to 3, weight percent based on the weight of the total compositions. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g., Diesel fuel, No. 2 fuel oil, etc., then usually about 0.001 to 0.5 wt. percent, based on the weight of the total composition of the reaction product will be used. Concentrates comprising a minor proportion, e.g., 10 to 45 wt. percent, of said reaction product in a major amount of hydrocarbon diluent, e.g., 95 to 55 wt. percent mineral lubricating oil, with or without other additives present, can also be prepared for ease of handling.

In the above compositions or concentrates, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tert. octylphenol sulfide, bis-phenols such as 4,4'-methylene bis(3,6-di-tert. butylphenol), viscosity index improvers such as the ethylene-higher olefin copolymer, polymethylacrylates, polyisobutylene, alkyl fumarate-vinyl acetate copolymers, and the like as well as other ashless dispersants or detergents such as overbased sulfonates.

The invention is further illustrated by means of the following illustrative embodiment, which is given for the purpose of illustration alone and is not meant to limit the invention to the particular reactants and amounts disclosed.

ILLUSTRATIVE EMBODIMENT I

A typical synthesis of the dispersant VI improver claimed was carried out using 10 grams of a 35% styrene-65% isoprene block copolymer which had been hydrogenated to a residual unsaturation of 0.4 meq/-gram as determined by ozone titration. The polymer was dissolved in 1,2,4-trichlorobenzene and chlorinated with 320 milligrams of chlorine for one hour at 50° C. Maleic anhydride (0.94 grams, 8.2 millimole) was added and the solution heated at 180° C for two hours under nitrogen. Pentaerythritol (1.1 gram, 8.1 millimole) was added and the solution heated at 210° C for 6 hours under nitrogen.

After functionization was complete, the solvent was distilled under vacuum as an equal weight of lube oil basestock was added. An amount of heptane equal to the oil was then added and the solution washed with methanol. Finally volatiles were removed by stripping with nitrogen.

Effectiveness of this product as a dispersant was demonstrated by its ability to bring about a stable emulsion of methanol and heptane, solvents which are normally immiscible. Effectiveness as a VI improver was demonstrated by measurement of the 100° F and 210° F viscosities of a 1% w solution in a common lubricating oil formulation, viz. 66.9 and 11.8 centistokes, respectively, (VI = 146).

What is claimed is:

1. The oil-soluble product prepared by the process comprising:
    a. reacting a selectively hydrogenated block copolymer having the general configuration A-B with maleic anhydride at a temperature of between about 180° C and 250° C and in the presence of a solvent wherein each polymer block A is a monoalkenylarene polymer having an average molecular weight of between about 25,000 and about 50,000 and each block B is a polymer of a $C_{4-8}$ conjugated diene having an average molecular weight of between about 35,000 and about 100,000 wherein between about 80% and about 98% of the aliphatic unsaturation has been reduced by hydrogenation while less than about 20% of the aromatic unsaturation has been reduced; and
    b. reacting the product of step (a) with an alkane polyol having at least two hydroxy groups at a temperature of between about 150° C and about 250° C.

2. The composition of claim 1 wherein said block copolymer and said maleic anhydride are reacted in the presence of a trichlorobenzene solvent in a ratio of moles of maleic anhydride to olefinic double bonds remaining in the selectively hydrogenated block copolymer of between about 1:1 and about 2:1.

3. The composition of claim 2 wherein said block copolymer and said maleic anhydride are reacted in the presence of a trichlorobenzene solvent and chlorine in a molar ratio of chlorine to maleic anhydride of between about 0.3:1 and about 1.5:1.

4. The composition of claim 1 wherein the diene is isoprene.

5. The composition of claim 1 wherein the alkane polyol is pentaerythritol and the molar ratio of polyol to maleic anhydride is between about 0.5:1 and about 2:1.

6. The composition of claim 5 wherein between about 90% and about 95% of the aliphatic unsaturation in the block copolymer has been reduced by hydrogenation.

7. A lubricating composition comprising a major amount of a lubricating oil and from 0.1 to about 10.0 weight percent of the oil-soluble product of claim 1.

8. A lubricating concentrate composition comprising a major amount of a lubricating oil and from about 10 to about 45 weight percent of the oil-soluble product of claim 1.

* * * * *